United States Patent
Unuma et al.

(10) Patent No.: US 11,131,988 B2
(45) Date of Patent: Sep. 28, 2021

(54) DIAGNOSTIC APPARATUS, DIAGNOSTIC METHOD, AND DIAGNOSTIC PROGRAM

(71) Applicant: HITACHI, LTD., Tokyo (JP)

(72) Inventors: Munetoshi Unuma, Tokyo (JP); Junsuke Fujiwara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 389 days.

(21) Appl. No.: 16/325,292

(22) PCT Filed: Sep. 2, 2016

(86) PCT No.: PCT/JP2016/075782
§ 371 (c)(1),
(2) Date: Feb. 13, 2019

(87) PCT Pub. No.: WO2018/042616
PCT Pub. Date: Mar. 8, 2018

(65) Prior Publication Data
US 2019/0171199 A1 Jun. 6, 2019

(51) Int. Cl.
G05B 23/02 (2006.01)
G06N 7/00 (2006.01)
G06N 20/00 (2019.01)
G01M 99/00 (2011.01)

(52) U.S. Cl.
CPC ......... G05B 23/0283 (2013.01); G01M 99/00 (2013.01); G05B 23/0235 (2013.01);
(Continued)

(58) Field of Classification Search
CPC ........... G05B 2219/23181; G05B 2219/37337; G05B 2219/41318; G05B 2219/49105;
(Continued)

(56) References Cited

U.S. PATENT DOCUMENTS 8,121,818 B2 * 2/2012 Gorinevsky ....... G05B 23/0281
702/183
9,678,845 B2 * 6/2017 Suzuki ................... G06F 11/30
(Continued)

FOREIGN PATENT DOCUMENTS

JP 2002-182736 A 6/2002
JP 2005-241089 A 9/2005
(Continued)

OTHER PUBLICATIONS

International Search Report of PCT/JP2016/075782 dated Nov. 1, 2016.
(Continued)

Primary Examiner — John H Le
(74) Attorney, Agent, or Firm — Mattingly & Malur, PC

(57) ABSTRACT

A diagnostic apparatus determines, at a reference time, whether a device is normal or abnormal, and in which operation state the device is at the time. A reference data creation unit repeats a process of storing sensor values acquired from the device while changing the operation state at the reference time in association with each of the determined operation states until there is no non-corresponding operation state with which the acquired sensor value is not yet associated. At a diagnosis time at which it is not known whether the device is normal or abnormal, an operation state and a sensor value of the device at the time is acquired. The stored sensor value associated with the acquired operation state is read to compare the sensor value acquired at the diagnosis time with the read sensor value to display a result of determination on whether the device is normal or abnormal.

13 Claims, 8 Drawing Sheets

(52) U.S. Cl.
CPC ..... *G05B 23/0264* (2013.01); *G05B 23/0281* (2013.01); *G06N 7/00* (2013.01); *G06N 20/00* (2019.01); *G05B 2219/23181* (2013.01)

(58) Field of Classification Search
CPC ............ G05B 23/0221; G05B 23/0235; G05B 23/0254; G05B 23/0264; G05B 23/0281; G05B 23/0283; G06N 20/00; G06N 7/00; G01M 99/00
USPC ................................................. 702/183, 184
See application file for complete search history.

(56) References Cited

U.S. PATENT DOCUMENTS

| | | |
|---|---|---|
| 2014/0195184 A1 | 7/2014 | Maeda et al. |
| 2015/0100534 A1 | 4/2015 | Ohtani et al. |
| 2016/0169771 A1 | 6/2016 | Hiruta et al. |

FOREIGN PATENT DOCUMENTS

| | | |
|---|---|---|
| JP | 2011-153902 A | 8/2011 |
| JP | 2011-174766 A | 9/2011 |
| JP | 2013-200143 A | 10/2013 |
| WO | 2011/024382 A1 | 3/2011 |

OTHER PUBLICATIONS

European Office Action received in corresponding European Application No. 16915176.8 dated Sep. 9, 2020.
Extended European Search Report received in corresponding European Application No. 16915176.8 dated Mar. 4, 2020.
Japanese Office Action received in corresponding Japanese Application No. 2018-536636 dated Feb. 4, 2020.

\* cited by examiner

FIG. 3
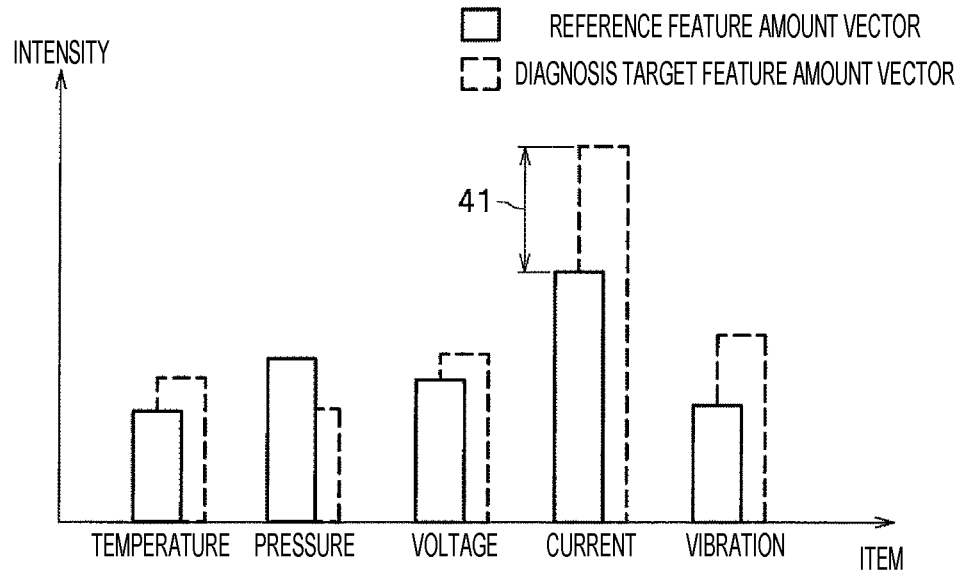
(a)
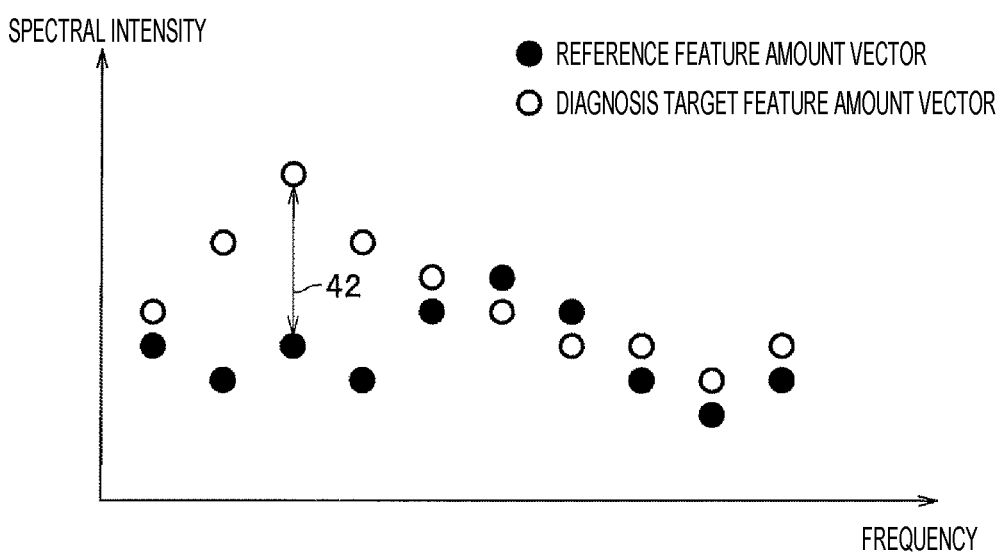
(b)

FIG. 4

| RECORD ID | OPERATION STATE | | | SENSOR VALUE | | | | | | | TIME | CLASSIFICATION | DIAGNOSIS RESULT |
|---|---|---|---|---|---|---|---|---|---|---|---|---|---|
| | LOAD FACTOR (%) | AIR TEMPERATURE (°C) | HUMIDITY (%) | TEMPERATURE | PRESSURE | CURRENT | VOLTAGE | VIBRATION | NOISE | ROTATION SPEED | | | |
| D001 | 10 | # | # | # | # | # | # | # | # | # | 20160701 10:00:00 | REFERENCE | NORMAL |
| D002 | 20 | # | # | # | # | # | # | # | # | # | 20160701 10:01:00 | REFERENCE | NORMAL |
| D003 | 40 | # | # | # | # | # | # | # | # | # | 20160701 10:02:00 | REFERENCE | NORMAL |
| D004 | 50 | # | # | # | # | # | # | # | # | # | 20160701 10:03:00 | REFERENCE | NORMAL |
| D005 | 70 | # | # | # | # | # | # | # | # | # | 20160701 10:04:00 | REFERENCE | NORMAL |
| D006 | 100 | # | # | # | # | # | # | # | # | # | 20160701 10:05:00 | REFERENCE | NORMAL |
| D007 | 100 | # | # | # | # | # | # | # | # | # | 20160701 10:06:00 | REFERENCE | NORMAL |
| D008 | 100 | # | # | # | # | # | # | # | # | # | 20160701 10:07:00 | REFERENCE | NORMAL |
| D009 | 100 | # | # | # | # | # | # | # | # | # | 20160701 10:08:00 | REFERENCE | NORMAL |
| D010 | 80 | # | # | # | # | # | # | # | # | # | 20160701 10:09:00 | REFERENCE | NORMAL |
| D011 | 60 | # | # | # | # | # | # | # | # | # | 20160701 10:10:00 | REFERENCE | NORMAL |
| D012 | 40 | # | # | # | # | # | # | # | # | # | 20160701 10:11:00 | REFERENCE | NORMAL |
| ... | | | | | | | | | | | | | |
| D101 | 70 | # | # | # | # | # | # | # | # | # | 20160705 12:00:00 | DIAGNOSIS TARGET | ? |
| D102 | 80 | # | # | # | # | # | # | # | # | # | 20160705 12:01:00 | DIAGNOSIS TARGET | ? |
| D103 | 20 | # | # | # | # | # | # | # | # | # | 20160710 15:00:00 | DIAGNOSIS TARGET | ? |
| D104 | 40 | # | # | # | # | # | # | # | # | # | 20160710 15:01:00 | DIAGNOSIS TARGET | ? |
| ... | | | | | | | | | | | | | |

FIG. 6

| OPERATION STATE ID | VECTOR ID | CLASSIFICATION | HORIZONTAL AXIS | UNTRANSFORMED SENSOR VALUE | COMPONENT DEFINITION | COMPONENT VALUE | COMPARISON TARGET |
|---|---|---|---|---|---|---|---|
| P001 | SV011 | REFERENCE | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | — |
| P001 | SV012 | REFERENCE | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | — |
| P001 | SV013 | REFERENCE | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | — |
| P001 | SV014 | REFERENCE | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | — |
| P001 | SV015 | REFERENCE | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | — |
| P001 | SV016 | REFERENCE | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | — |
| P001 | SV017 | REFERENCE | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | — |
| P002 | SV021 | REFERENCE | ITEM AXIS | — | (TEMPERATURE, PRESSURE, VOLTAGE, CURRENT, VIBRATION) | (#,#,#,#,#) | — |
| P002 | SV022 | REFERENCE | ITEM AXIS | — | (TEMPERATURE, PRESSURE, VOLTAGE, CURRENT, VIBRATION) | (#,#,#,#,#) | — |
| P002 | SV023 | REFERENCE | ITEM AXIS | — | (TEMPERATURE, PRESSURE, VOLTAGE, CURRENT, VIBRATION) | (#,#,#,#,#) | — |
| $\cdots$ | | | | | | | |
| P002 | SV028 | REFERENCE | ITEM AXIS | — | (TEMPERATURE, PRESSURE, VOLTAGE, CURRENT, VIBRATION) | (#,#,#,#,#) | — |
| $\cdots$ | | | | | | | |
| P001 | EV01 | EVALUATION TARGET | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | AVERAGE OF SV011,$\cdots$ |
| P005 | EV02 | EVALUATION TARGET | ITEM AXIS | — | (TEMPERATURE, PRESSURE, VOLTAGE, CURRENT, VIBRATION) | (#,#,#,#,#) | AVERAGE OF SV111,$\cdots$ |
| P007 | EV03 | EVALUATION TARGET | ITEM AXIS | — | (TEMPERATURE, PRESSURE, VOLTAGE, CURRENT, VIBRATION) | (#,#,#,#,#) | AVERAGE OF SV131,$\cdots$ |
| P008 | EV04 | EVALUATION TARGET | FREQUENCY AXIS | VIBRATION | ($f_1$Hz,$f_2$Hz,$f_3$Hz,$f_4$Hz,$f_5$Hz,$\cdots$,$f_{10}$Hz) | (#,#,#,#,#,$\cdots$,#) | AVERAGE OF SV141,$\cdots$ |
| $\cdots$ | | | | | | | |

FIG. 8

VECTOR REGISTRATION STATE SCREEN 51

| | OPERATION STATE 53 | | | QUALITY 54 | REGISTRATION STATE 55 | COMPREHENSIVE EVALUATION 56 |
|---|---|---|---|---|---|---|
| OPERATION STATE ID 52 | LOAD FACTOR (%) | AIR TEMPERATURE (°C) | HUMIDITY (%) | | | |
| P001 | LOWER THAN 30 | LOWER THAN 20 | LOWER THAN 40 | SMALL VARIATION | COMPLETED | ○ |
| P002 | LOWER THAN 30 | LOWER THAN 20 | 40 OR HIGHER | LARGE VARIATION | COMPLETED | △ |
| P003 | LOWER THAN 30 | 20 OR HIGHER | LOWER THAN 40 | SMALL VARIATION | COMPLETED | ○ |
| P004 | LOWER THAN 30 | 20 OR HIGHER | 40 OR HIGHER | SMALL VARIATION | UNCOMPLETED | △ |
| P005 | 30 OR HIGHER AND LOWER THAN 70 | LOWER THAN 20 | LOWER THAN 40 | | NO DATA | × |
| ... | | | | | | |
| ALL OPERATION STATES | | | | | | × 57 |

DIAGNOSTIC APPARATUS, DIAGNOSTIC METHOD, AND DIAGNOSTIC PROGRAM

TECHNICAL FIELD

The present invention relates to a diagnostic apparatus, a diagnostic method, and a diagnostic program.

BACKGROUND ART

Recently, devices with driving parts have been used in many industrial fields. In general, labor and an economic loss for restoration are extremely great when suddenly failure occurs in a device incorporated in a large-scale production facility. In addition, if the device having a driving part fails, not only noise and vibration increase, but also parts and the like are often scattered to damage the periphery thereof. Therefore, it is essential to detect a sign of failure as soon as possible during a daily operation and to take preventive maintenance particularly for the device having the driving part.

An abnormal sound diagnostic apparatus of PTL 1 compares a sound emitted from a device as a diagnosis target with a sample of sound stored in advance to detect an abnormality of the device. The abnormal sound diagnostic apparatus stores sound samples in association with operation states including environmental conditions such as temperature and atmospheric pressure and operation conditions such as a tension and a load. At a diagnosis time of the device, the abnormal sound diagnostic apparatus searches for a sound sample with an operation state of the device as the diagnosis target as a search key and compares a sound actually emitted by the device as the diagnosis target with the sound sample which is a search result.

CITATION LIST

Patent Literature

PTL 1: JP 2013-200143 A

SUMMARY OF INVENTION

Technical Problem

Here, it is assumed that a device as a diagnosis target is emitting a sound under a certain specific operation state. A user of the device wishes to know whether the sound currently being emitted indicates an abnormality of the device by using the abnormal sound diagnostic apparatus of PTL 1. However, if a sample of a sound corresponding to a current operation state is not stored in advance, it is difficult to acquire a sample of a sound that needs to be compared with the sound currently being emitted, which makes diagnosis impossible. That is, the abnormal sound diagnostic apparatus does not guarantee that sound samples corresponding to all operation states are available. Therefore, the present invention aims to prepare samples of sensor values corresponding to all operation states of a device.

Solution to Problem

A diagnostic apparatus of the present invention includes: an operation state determination unit that determines, at a reference time at which whether a device is normal or abnormal is known, which operation state of the device at the time among a plurality of operation states; a reference data creation unit that repeats a process of storing sensor values acquired from the device while changing the operation state at the reference time in a storage unit in association with each of the determined operation states until there is no non-corresponding operation state with which the acquired sensor value is not yet associated; a diagnostic data creation unit that acquires, at a diagnosis time at which it is not known whether the device is normal or abnormal, an operation state and a sensor value of the device at the time; and a diagnosis unit that reads the sensor value associated with the acquired operation state from the storage unit and compares the sensor value acquired at the diagnosis time with the read sensor value to display a result of determination on whether the device is normal or abnormal.

In addition, the other means will be described in the description of embodiments.

Advantageous Effects of Invention

According to the present invention, it is possible to prepare the samples of the sensor values corresponding to all the operation states of the device.

BRIEF DESCRIPTION OF DRAWINGS

FIGS. 3(a) and 3(b) are views for describing a method of comparing feature amount vectors.

FIG. 4 is a view illustrating examples of sensor value information.

FIG. 6 is a view illustrating examples of vector component information.

FIG. 8 is a view for describing a vector registration status screen.

DESCRIPTION OF EMBODIMENTS

Hereinafter, a mode for carrying out the present invention (referred to as "the present embodiment") will be described in detail with reference to the drawings and the like. Specifically, an example in which a diagnostic apparatus diagnoses signs of an electric motor and a load run by the electric motor will be described.

(Configuration of Diagnostic Apparatus)

Figure 1:
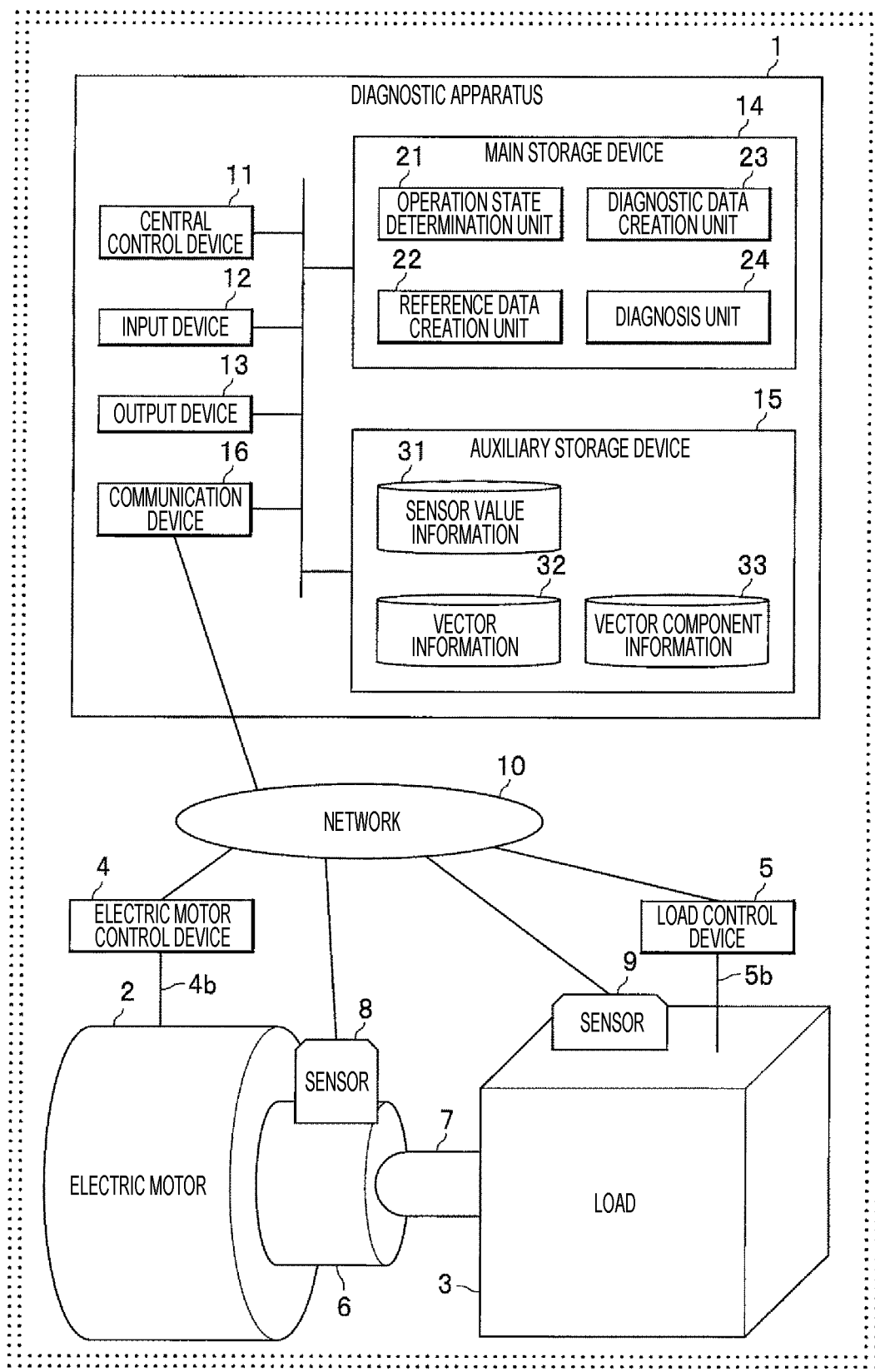
FIG. 1 is a diagram illustrating a configuration of a diagnostic apparatus.

A configuration of a diagnostic apparatus will be described with reference to FIG. 1. The diagnostic apparatus 1 is a general computer. The diagnostic apparatus 1 includes a central control device 11, an input device 12, an output device 13, a main storage device 14, an auxiliary storage device 15, and a communication device 16. These devices are connected via a bus. The auxiliary storage device 15 stores sensor value information 31, vector information 32, and vector component information 33 (which will be described later in detail). An operation state determination unit 21, a reference data creation unit 22, a diagnostic data creation unit 23, and a diagnosis unit 24 in the main storage device 14 are programs. In the following description, the case of stating an operating subject as a "○○ unit" means that the central control device 11 reads out the ○○ unit from the auxiliary storage device 15 to be loaded in the main storage device 14 to realize a function (which will be described later in detail) of the ○○ unit.

An electric motor 2 drives a load 3 via a rotating shaft 7. The load herein is, for example, an air compressor, a metal rolling device, a wheel (transmission) of a vehicle, or the like. An electric motor control device 4 controls a rotation speed of the electric motor 2 or the like. Power and a control signal pass through a cable 4*b*. A load control device 5 controls a running state of the load 3. Power and a control signal pass through a cable 5*b*. A sensor 8 is attached to a bearing 6 of the electric motor 2, and the sensor 8 measures rotation speed, temperature, vibration, and the like of the rotating shaft 7. A sensor 9 is also attached to the load 3 to measure temperature, vibration, and the like of the load 3.

The electric motor control device 4, the load control device 5, and the sensors 8 and 9 are connected to the communication device 16 of the diagnostic apparatus 1 via a wired or wireless network 10. The sensors 8 and 9 may be connected to the network 10 via the electric motor control device 4 and the load control device 5, respectively. A type of the sensor, an attachment position, and a physical quantity of an object to be measured may be arbitrary. The physical quantity of the object to be measured may be, for example, a current, a voltage, speed, acceleration, a sound, vibration, temperature (of a main body, a refrigerant, or the like), pressure, a flow rate, or the like depending on types of the electric motor 2 and the load 3.

The diagnostic apparatus 1 can not only acquire such an arbitrary physical quantity for the electric motor 2 and the load 3 but also calculate the measured physical quantity to acquire secondary data such as a load factor relating to an operation state. Further, the diagnostic apparatus 1 can also acquire physical quantities relating to the environment of the electric motor 2 and the load 3 such as temperature, humidity, atmospheric pressure, and the like via other sensors. Hereinafter, the electric motor 2 and the load 3 will be collectively referred to as "devices".

(Feature Amount Vector)

In the present embodiment, a feature amount is a sensor value used for diagnosis among sensor values measured from the devices. A feature amount vector is a vector having such a sensor value as a component or a vector having a spectral intensity at a specific frequency, which is a result of performing fast Fourier transform of such a sensor value, as a component (which will be described later in detail).

There are two types of the feature amount vector, that is, a "diagnosis target feature amount vector" and a "reference feature amount vector". Here, it is assumed that a device that is not known to be normal or abnormal is the diagnosis target. A feature amount vector at a time when the device as the diagnosis target is being operated (referred to as a "diagnosis time") is a diagnosis target feature amount vector. On the other hand, a feature amount vector at a time when a device that is known to be normal or abnormal is being operated (referred to as a "reference time") is a reference feature amount vector. It is also possible to say that the reference feature amount vector is a sample indicating a normal state or an abnormal state. It is possible to diagnose whether the device as the diagnosis target is normal or abnormal by comparing the diagnosis target feature amount vector with the reference feature amount vector.

The device repeats a normal state and an abnormal state (although the device is not damaged) within a long lifetime. In general, it is already known that the device is normal immediately after shipment from a factory and immediately after maintenance. When a considerable period elapses without the maintenance of the device, whether the device is normal is not known. For example, a reference feature amount vector of a certain device is acquired at the reference time. Thereafter, when the diagnosis target feature amount vector of the machine acquired at the time of diagnosis is compared with the reference feature amount vector, it is determined whether the device is normal at the diagnosis time.

In this manner, in principle, the reference feature amount vector and the diagnosis target feature amount vector are acquired from the same single device. However, as an exception, the reference feature amount vector may be acquired from another device of the same type, or application software for simulation may generate the reference feature amount vector.

A process of creating the feature amount vector will be described with reference to FIG. 2. In Case 1 of FIG. 2, components of the reference feature amount vector and the diagnosis target feature amount vector are a plurality of types of sensor values at a reference time and a diagnosis time, respectively. The diagnostic apparatus 1 creates the diagnosis target feature amount vector and the reference feature amount vector each having, for example, sensor values of temperature, pressure, a voltage, a current, and vibration as the component. Fluctuation ranges of these actual sensor values are different from each other. Accordingly, the diagnostic apparatus 1 may normalize the actual sensor values such that the fluctuation widths become the same (for example, 1 to 10). The normalized sensor value is referred to as an "intensity". Both the vectors are comparable since the number of components is the same. It is a matter of course that a value that is not normalized may be referred to as the "intensity".

Figure 2:
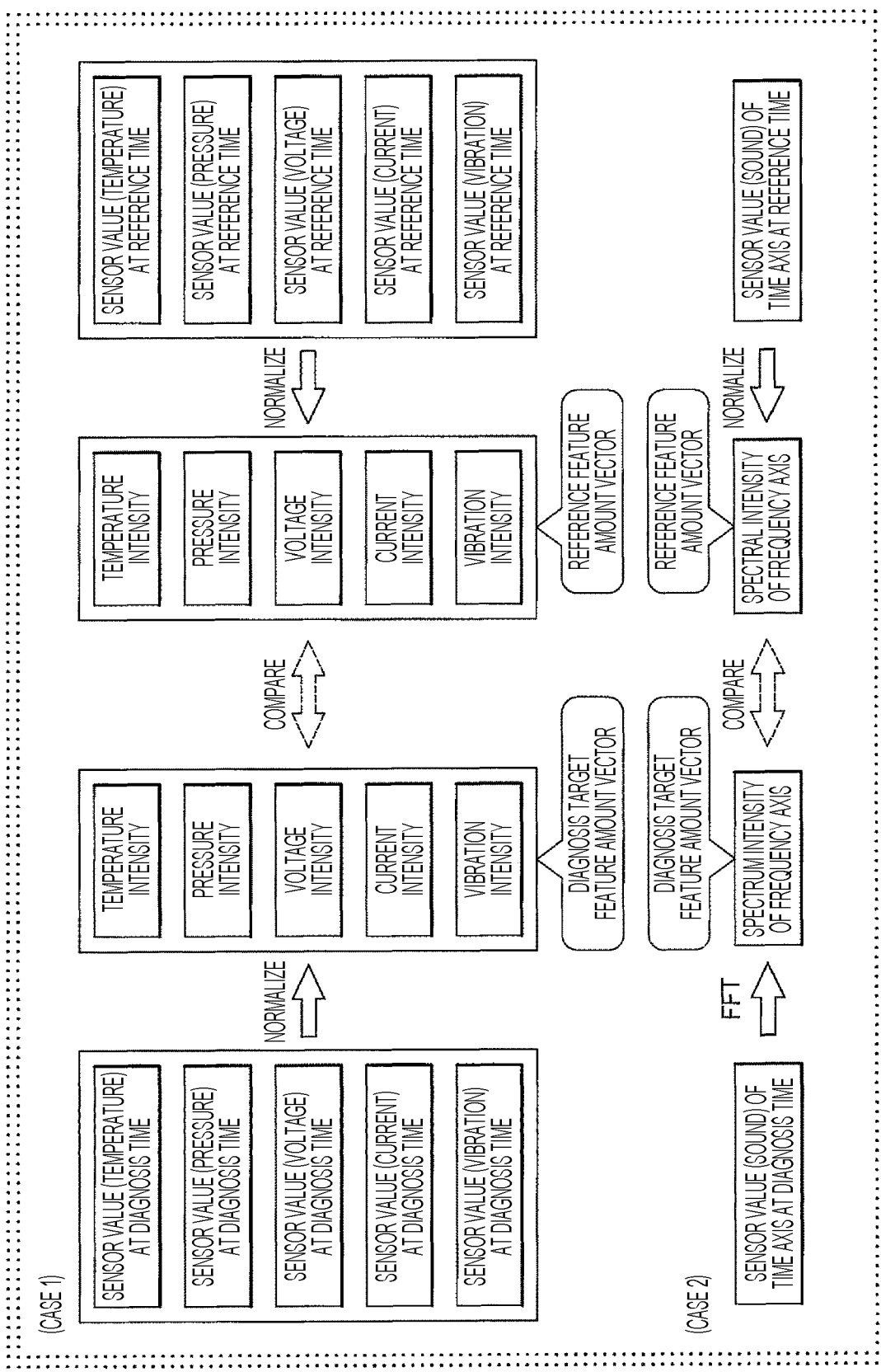
FIG. 2 is a view illustrating a process of creating a feature amount vector.

In Case 2 of FIG. 2, the diagnostic apparatus 1 performs fast Fourier transform (FFT) on a waveform on a time axis of a specific sensor value (for example, a sound) of the device at the diagnosis time and the reference time to acquire a spectral intensity on a frequency axis. The diagnostic apparatus 1 extracts spectral intensities at arbitrary plural (for example, ten) frequencies to create the diagnosis target feature amount vector and the reference feature amount vector having the extracted ten spectral intensities as components. Both the vectors are comparable since the number of components is the same.

A method of comparing the feature amount vectors will be described with reference to FIG. 3. FIG. 3(*a*) corresponds to Case 1 of FIG. 2, and FIG. 3(*b*) corresponds to Case 2 of FIG. 2. In FIG. 3(*a*), five solid bar graphs and five dashed bar graphs are lined up on a coordinate plane with an item on the horizontal axis and an intensity (normalized sensor value) on the vertical axis. The item herein means a type of a sensor value. Each height (intensity) of the five solid bar graphs corresponds to each of five components of the reference feature amount vector. Each height of the five dashed bar graphs corresponds to each of five components of the diagnosis target feature amount vector. The diagnostic apparatus 1 calculates a difference 41 between the height of the solid bar graph and the height of the dashed bar graph for each item.

In FIG. 3(*b*), ten "○" and ten "●" are plotted on a coordinate plane with a frequency on the horizontal axis and a spectral intensity on the vertical axis. The ten black circles correspond to the ten components of the reference feature amount vector, respectively. The ten white circles correspond to the ten components of the diagnosis target feature amount vector, respectively. The black circle and the white circle are plotted one by one on ten specific frequencies on the horizontal axis. In FIG. 3(*b*), intervals of these frequencies are the same, but are not necessarily the same. The diagnostic apparatus 1 calculates a distance 42 between the black circle and the white circle for each frequency.

(Modification of Feature Amount Vector)

All the components of the feature amount vector are not necessarily the intensities on the item axis (FIG. 3(*a*)), and are not necessarily spectral intensities on the frequency axis (FIG. 3(*b*)). For example, a ten-dimensional feature amount vector is assumed here. A first component to a fourth component of the feature amount vector may be sensor values of temperature, pressure, a voltage, and a current, and a fifth component to a tenth component may be spectral intensities at specific six frequencies among the spectral intensities obtained by fast Fourier transform of a sensor value of vibration.

(Sensor Value Information)

The sensor value information 31 will be described with FIG. 4. First, an "operation state" will be described as a premise to describe the sensor value information 31. The operation state is an arbitrary numerical value (index) that describes a state of the device at a time when a sensor value is measured. Examples of the operation state are as follows.

An operation condition (for example, rotation speed) and the like which has been instructed to the electric motor 2 by the electric motor control device 4 and the like An operation condition (for example, refrigerant temperature) and the like which has been instructed to the load 3 by the load control device 5 and the like A value indicating a burden of a device (for example, a ratio (load factor) of an actual output at a certain time relative to the maximum output of the electric motor 2), and the like Environmental conditions (air temperature, humidity) and the like of the electric motor 2 or the load 3

The operation state may be a sensor value itself or a value calculated using the sensor value. Hereafter, the description will continue assuming that there are three operation states of a load factor (%), air temperature (° C.) and humidity (%).

Returning to FIG. 4, in the sensor value information 31, values of small fields 102*a* to 102*c* are stored in an operation state field 102, values of small fields 103*a* to 103*g* are stored in a sensor value field 103, a time is stored in a time field 104, a classification is stored in a classification field 105, and a diagnosis result is stored in a diagnosis result field 106 in association with a record ID stored in a record ID field 101.

The record ID in the record ID field 101 is an identifier uniquely identifying a record (row) of the sensor value information 31.

A load factor in the load factor field 102*a* in the operation state field 102 is the above-described load factor.

Air temperature in the air temperature field 102*b* is ambient temperature of a device. Incidentally, "#" indicates that different values exist in the corresponding field in an abbreviated manner (which is similarly applied hereinafter).

Humidity in the humidity field 102*c* is ambient humidity of a device.

Temperature in the temperature field 103*a* of the sensor value field 103 is temperature of a device itself. It is a matter of course that temperature of a coolant, cooling water, or the like may be used. Although a detailed description on the pressure field 103*b* to the rotation speed field 103*g* will be omitted hereinafter, measurement values acquired from sensors of a device are stored in the respective small fields of the sensor field 103. What type of physical quantity that is used as a sensor value depends on the nature of the device.

A time in the time field 104 is a year, a month, a date, an hour, a minute, a second at a time when a sensor value is acquired. More precisely, the time has a time width (window width) of a few seconds, for example. This is because a small time width is required to perform the fast Fourier transform on the sensor value on the time axis as described above. Incidentally, "a few seconds" is an example, and it may take more time.

A classification in the classification field 105 is either "reference" or "diagnosis target". "Reference" indicates that a sensor value of the corresponding record is used to create the reference feature amount vector. "Diagnosis target" indicates that a sensor value of the corresponding record is used to create the diagnosis target feature amount vector.

A diagnosis result in the diagnosis result field 106 is any one of "normal", "abnormal" and "?". Diagnosis results of records D001 to D012 in FIG. 4 are "normal". This indicates that the device is known to be normal at every time of the records D001 to D012. If the diagnosis result of the record D001 is "abnormal", this indicates that the device is known to be abnormal at the time of the record D001. Diagnosis results of records D101 to D104 in FIG. 4 are "?". This indicates that it is not known whether the device is normal or abnormal at every time of the records D101 to D104.

It is possible to understand the following when referring again to FIG. 4 as a whole.

A certain device was operated from 10:00:00 to 10:11:00 on Jul. 1, 2016. Meanwhile, a load factor of the device was initially 10%, soon rose to 100% and finally was 40%. Meanwhile, the device was normal.

The device was operated from 12:00:00 to 12:01:00 on Jul. 5, 2016. Meanwhile, a load factor of the device was initially 70% and finally was 80%. Meanwhile, it is unknown whether the device was normal or abnormal.

The device was operated from 15:00:00 to 15:01:00 on Jul. 10, 2016. Meanwhile, a load factor of the device was initially 20% and finally was 40%. Meanwhile, it is unknown whether the device was normal or abnormal.

Here, it is assumed that it is diagnosed whether the device was normal at 12:00:00 on Jul. 5, 2016. The diagnostic apparatus 1 creates a diagnosis target feature amount vector using the sensor value of the record D101. A problem is which record on Jul. 1, 2016 the diagnostic apparatus 1 is to use to create the reference feature amount vector.

For example, the accuracy of diagnosis is higher in the case of using a sensor value of the record D005 than the case of using a sensor value of the record D001. This is because the load factor "70%" of the record D101 coincides with the load factor "70%" of the record D005. Here, the temperature and humidity among the operation states are discarded to simplify the description. However, it is more desirable for the diagnostic apparatus 1 to search for a record with which all the load factor, temperature, and humidity of the record D101 coincide from a record whose classification is "reference", and use a sensor value of the searched record to create the reference feature amount vector.

(Vector Information)

The vector information 32 will be described with reference to FIG. 5. In the vector information 32, a load factor is stored in a load factor field 112, air temperature is stored in the air temperature field 113, humidity is stored in the humidity field 114, the number of reference feature amount vectors is stored in a reference feature amount vector number field 115, a reference feature amount vector ID is stored in a reference feature amount vector ID field 116, a reference feature amount vector quality is stored in a reference feature amount vector quality field 117, and an evaluation target feature amount vector ID is stored in an evaluation target feature amount vector ID field 118, in association with an operation state ID stored in an operation state ID field 111.

The operation state ID in the operation state ID field 111 is an identifier uniquely identifying an operation state. More precisely, the operation state ID herein is an identifier uniquely identifying a combination of a load factor range, an air temperature range, and a humidity range.

The load factor of the load factor field 112 is the above-described load factor.

The air temperature in the air temperature field 113 is the same as the air temperature in FIG. 4.

The humidity in the humidity field 114 is the same as the humidity in FIG. 4.

The number of reference feature amount vectors in the reference feature amount vector number field 115 is the number of reference feature amount vectors created using sensor values acquired in the corresponding operation state.

The reference feature amount vector ID of the reference feature amount vector ID field 116 is a vector ID (which will be described later in detail) of the reference feature amount vector created using a sensor value acquired in the corresponding operation state. One or plural reference feature amount vector IDs are stored. The reference feature amount vector ID field 116 of a record whose reference feature amount vector number is "0" is blank.

The reference feature amount vector quality in the reference feature amount vector quality field 117 is a statistical value indicating a variation of the reference feature amount vector or a character string representing the statistical value. For example, if attention is paid to a record in the first row, it is possible to understand that seven reference feature amount vectors are created in an operation state P001. As variations among values of each component of these seven reference feature amount vectors are small, the individual reference feature amount vectors among the seven reference feature amount vectors are more suitably compared with an evaluation target feature amount vector. More precisely, the "variation" herein is, for example, an average value of a "variance" of each component (an average value of a temperature variance, a pressure variance, a voltage variance, or the like). The reference feature amount vector quality field 117 of a record whose reference feature amount vector number is "0" is blank (see also Modification 1 to be described later).

The evaluation target feature amount vector ID of the evaluation target feature amount vector ID field 118 is a vector ID of an evaluation target feature amount vector that can be compared with a reference feature amount vector of the corresponding record. "Not comparable" is stored in the evaluation target feature amount vector ID field 118 of the record whose reference feature amount vector number is "0".

(Combination of Plurality of Operation States)

Attention is paid to the left side of the double line in the vector information 32. The load factor is defined in the range of 0% to 100%. Here, the whole range is divided into three ranges of "lower than 30", "30 or higher and lower than 70" and "70 or higher". Similarly, the whole range regarding the temperature is divided into two ranges of "lower than 20" and "20 or higher". Regarding the humidity, the whole range is divided into two ranges of "lower than 40" and "40 or higher". Then, there are twelve combinations of the ranges of the three operation states, 3×2×2=12 since each operation state can take a certain value independently.

As a matter of course, what operation state that is to be selected as the individual operation state, the number of divisions to be set, and what value to be set as a threshold for the division depend on the user's setting. For example, a load factor at which a device is the most stable may be set as the threshold, or a resonance point at which vibration of the device becomes the largest when an operation state is "vibration" may be set as the threshold.

(Transition of Operation State)

Figure 5:
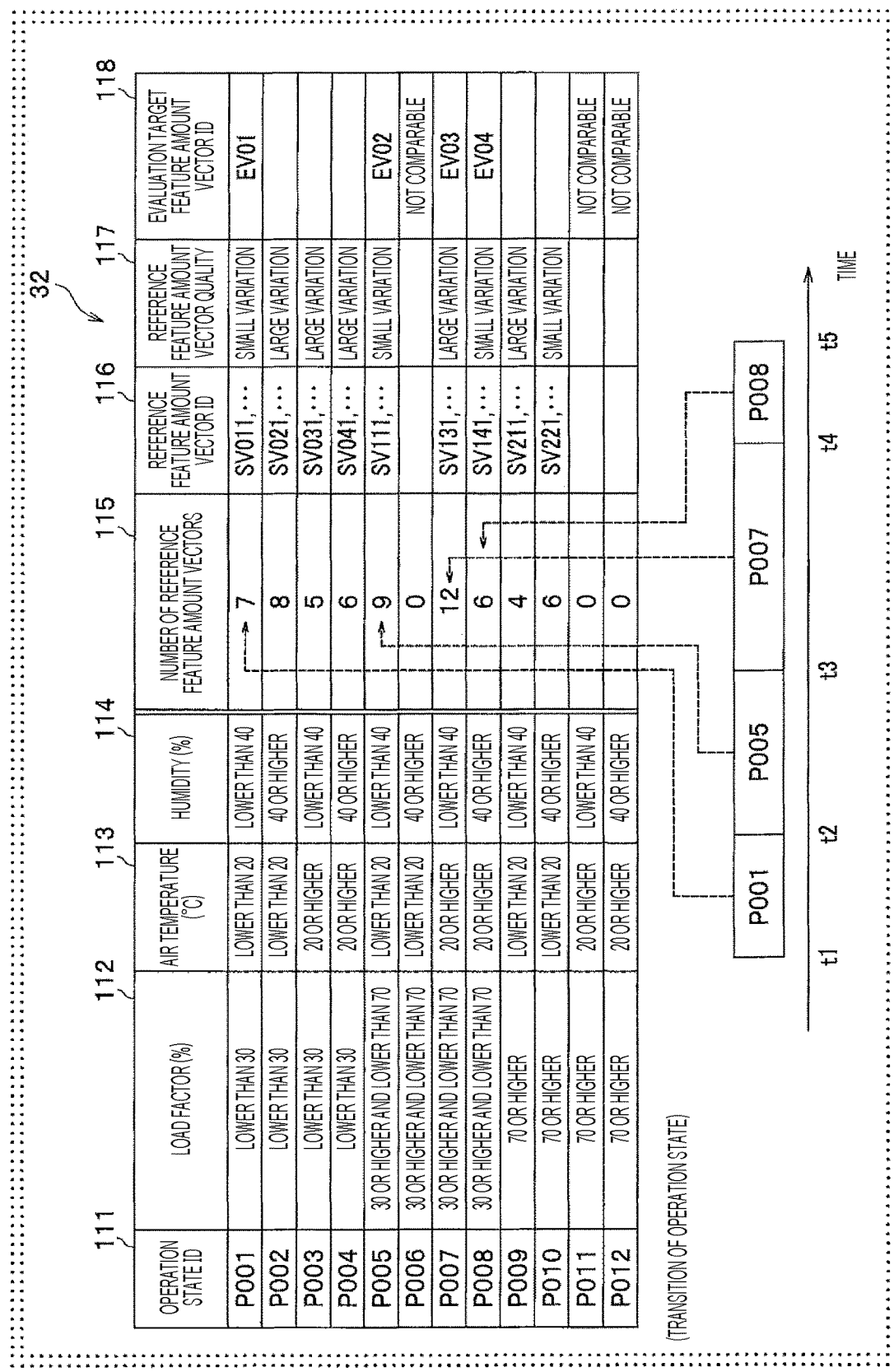
FIG. 5 is a view illustrating examples of vector information.

Attention is paid to a view on the lower part of FIG. 5. It is assumed that a certain device starts to operate at a time t1, and then, the device stops operating at a time t5 after a lapse of times t2, t3, and t4. Further, all the times t1 and t5 are reference times. That is, whether the device is normal or abnormal is known at the times t1 to t5. Hereinafter, a relationship between the transition of the operation state during the operation and the vector information 32 is studied in a time-series manner.

(Time t1 to t2) The operation state of the device was P001. The diagnostic apparatus 1 created seven reference feature amount vectors.

(Time t2) Only the load factor increased without any change in the temperature and humidity.

(Time t2 to t3) The operation state of the device has changed to P005. The diagnostic apparatus 1 created nine reference feature amount vectors.

(Time t3) Only the temperature increased without any change in the load factor and humidity.

(Time t3 to t4) The operation state of the device has changed to P007. The diagnostic apparatus 1 created twelve reference feature amount vectors.

(Time t4) Only the humidity increased without any change in the load factor and temperature.

(Time t4 to t5) The operation state of the device has changed to P008. The diagnostic apparatus 1 created six reference feature amount vectors.

(Vector Component Information)

The vector component information 33 will be described with reference to FIG. 6. In the vector component information 33, a vector ID is stored in a vector ID field 122, a classification is stored in a classification field 123, a horizontal axis is stored in a horizontal axis field 124, an untransformed sensor value is stored in an untransformed sensor value field 125, a component definition is stored in a component definition field 126, a component value is stored in a component value field 127, and a comparison target is stored in a comparison target field 128, in association with an operation state ID stored in an operation state ID field 121.

The operation state ID in the operation state ID field 121 is the same as the operation state ID in FIG. 5.

The vector ID in the vector ID field 122 is an identifier uniquely identifying a reference feature amount vector and an evaluation target feature amount vector.

The classification of the classification field 123 is the same as the classification of FIG. 4. However, "reference" herein means that a feature amount vector of the corresponding record is a reference feature amount vector. "Diagnosis target" indicates that a feature amount vector of the corresponding record is a diagnosis target feature amount vector.

The horizontal axis of the horizontal axis field 124 is either "frequency axis" or "item axis". "Frequency axis" indicates that the corresponding feature amount vector is obtained as FIG. 3(*b*) (fast Fourier transform is performed) when being expressed on a coordinate plane. "Item axis" indicates that the corresponding feature amount vector is obtained as FIG. 3(*a*) (fast Fourier transform is not performed) when being expressed on a coordinate plane.

The untransformed sensor value in the untransformed sensor value field 125 is a type of a sensor value to be subjected to fast Fourier transform. Incidentally, "-" indicating that there is no corresponding data is stored in the untransformed sensor value field 125 of a record whose horizontal axis field 124 is "item axis".

The component definition in the component definition field 126 is data describing what meaning that each component of a feature amount vector has. For example, "($f_1$ Hz, $f_2$ Hz, $f_3$ Hz, $f_4$ Hz, $f_5$ Hz, . . . , and $f_{10}$ Hz)" describes the following.

There are ten components of the feature amount vector.
These components indicate spectral intensities at $f_1$ Hz, $f_2$ Hz, . . . , and $f_{10}$ Hz in order from the first.

As another example, "(temperature, pressure, voltage, current, vibration)" describes the following.

There are five components of the feature amount vector. Incidentally, "noise" and "rotation speed" in the sensor value field 103 of FIG. 4 are omitted for the sake of simplicity of the description.
These components indicate intensities obtained by normalizing sensor values measured by a temperature sensor, a pressure sensor, . . . , and a vibration sensor in order from the first.

The component value of the component value field 127 is a value itself of a component of a feature amount vector.

The comparison target in the comparison target field 128 is a vector ID and a character string indicating a reference feature amount vector with which a certain evaluation target feature amount vector needs to be compared. The comparison target is stored only in the comparison target field 128 of a record whose classification is "evaluation target", and "-" indicating that there is no data is stored in the comparison target field 128 of the other records.

For example, "average of SV011, . . . " is stored in the comparison target field 128 of a record whose vector ID is EV01. This indicates the following.

"EV01" is an evaluation target feature amount vector, and has a spectral intensity obtained as a result of fast Fourier transformation of a sensor value of vibration as a component.
An operation state at a time when the sensor value of the vibration was acquired was "P001".
There are seven reference feature amount vectors corresponding to the operation state P001, and vector IDs thereof are SV011, SV012, . . . , and SV017 (see a record on the first row of the vector information 32 in FIG. 5).
Therefore, EV01 needs be compared with a reference feature amount vector having, as a component, an average value of each component of the seven reference feature amount vectors SV011 and so on.

(Processing Procedure)

Figure 7:
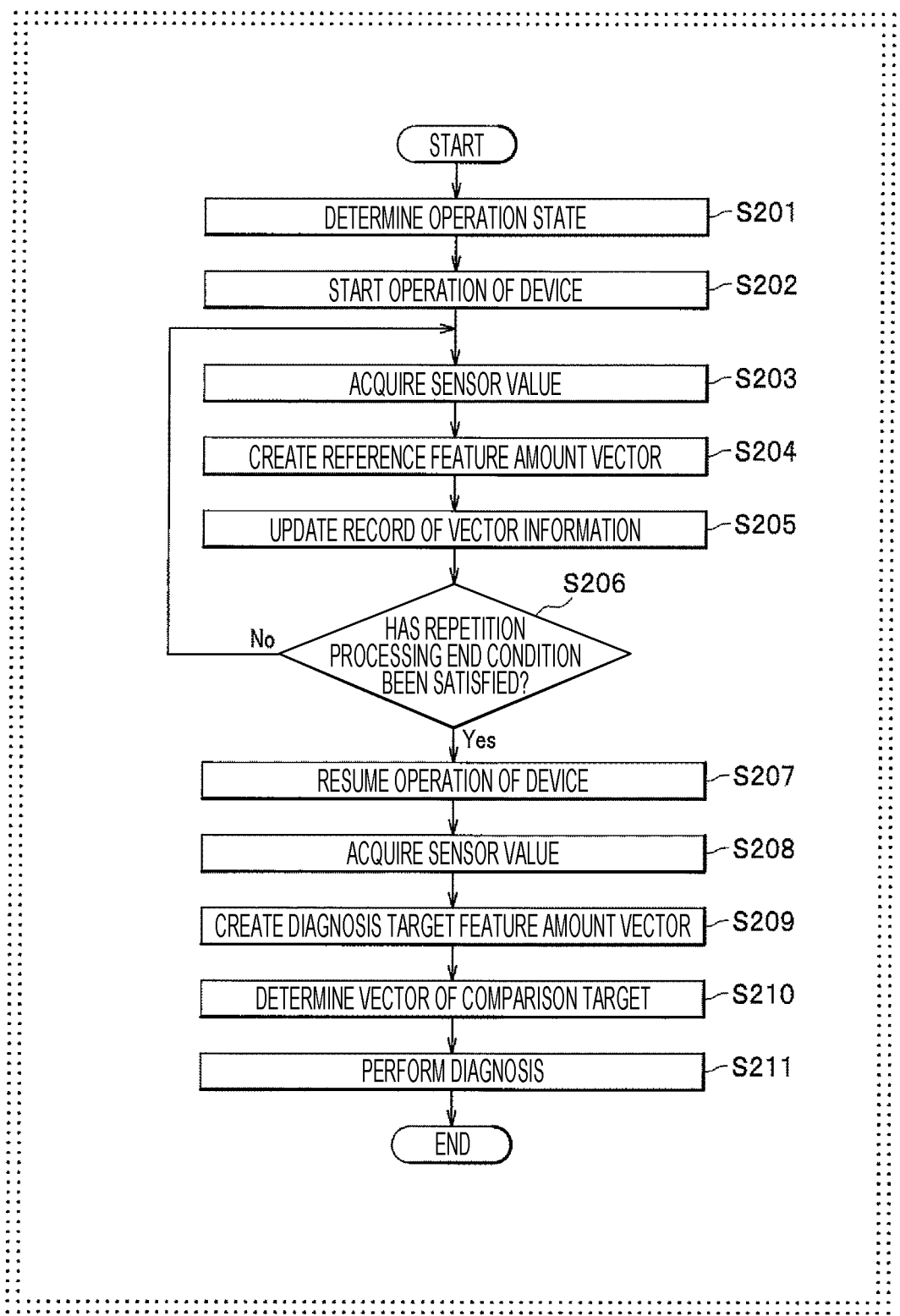
FIG. 7 is an example of a flowchart of a processing procedure.

A processing procedure will be described along FIG. 7.

In Step S201, the operation state determination unit 21 of the diagnostic apparatus 1 determines an operation state. Specifically, firstly, the operation state determination unit 21 receives one or a plurality of operation states (a load factor, temperature, humidity, and so on) and thresholds for dividing an assumable whole range of each operation state into a plurality of ranges input via the input device 12 by a user. Here, it is assumed that the user has input the three operation states "load factor", "temperature" and "humidity" and input "30% and 70%", "20° C." and "40%" as the respective thresholds. The "assumable whole range" herein is a range of an operation state that can be taken naturally when a device operates on a daily basis (including manual control and automatic control).

Secondly, the operation state determination unit 21 divides the whole range of each operation state by the threshold to create a combination of divided operation state ranges. In the above example, 3×2×2=12 combinations are created.

Thirdly, the operation state determination unit 21 creates new twelve records of the vector information 32 (FIG. 5), assigns operation state IDs, and stores the operation state IDs in the operation state ID field 111 of the new records. Then, the operation state determination unit 21 stores the combinations of ranges of the operation states created in "secondly" of Step S201 in the load factor field 112, the air temperature field 113, and the humidity field 114 of the new record. The operation state determination unit 21 stores "0" (initial value) in the reference feature amount vector number field 115 of the new record, stores "not comparable" (initial value) in the evaluation target feature amount vector ID field 118, and leaves the other fields as blanks.

In Step S202, the reference data creation unit 22 of the diagnostic apparatus 1 starts an operation of a device. Specifically, for example, when the devices are the electric motor 2 and the load 3, the reference data creation unit 22 transmits an operation start signal to the electric motor control device 4 and the load control device 5. At this time, it is assumed that the devices are known to be normal. Then, the devices change operation states variously and continue to operate by user's control or automatic control.

In Step S203, the reference data creation unit 22 acquires sensor values. Specifically, firstly, the reference data creation unit 22 acquires the sensor values from the sensors 8 and 9, and further acquires the respective operation states from other sensors.

Secondly, the reference data creation unit 22 creates a new record of the sensor value information 31 (FIG. 4).

Thirdly, the reference data creation unit 22 stores the operation states and the sensor values acquired in "firstly" of Step S203 in the operation state field 102 and the sensor value field 103 of the newly created record.

Fourthly, the reference data creation unit 22 stores an assigned record ID, a year, a month, a date, an hour, a minute, a second at a current time, "reference", and "normal" in the record field 101, the time field 104, the classification field 105, and the diagnosis result field 106 of the newly created record, respectively. The record of the sensor value information 31 completed herein is referred to as a "reference sensor value record".

In Step S204, the reference data creation unit 22 creates a reference feature amount vector. Specifically, firstly, the reference data creation unit 22 creates a reference feature amount vector using the sensor values of the reference sensor value record in accordance with rules designated in advance by the user. A method of creating the reference feature amount vector is the same as that described in FIGS. 2, 3(*a*), and 3(*b*).

Incidentally, the "rules" herein are, for example, as follows.

(Rule 1) When an acquired sensor value is a sound or vibration, the reference data creation unit 22 performs fast Fourier transform on the sensor value to acquire spectral intensities on the frequency axis, and creates a reference feature amount vector of the type of Case 2 in FIG. 2 and FIG. 3(*b*). In this case, the reference data creation unit 22 extracts a predetermined number of (for example, ten) spectral intensities at different frequencies from among the acquired spectral intensities to create the reference feature amount vector having the extracted spectral intensities as components.

(Rule 2) When the acquired sensor value is other than the sound or vibration, the reference data creation unit 22 normalizes the sensor value to acquire an intensity on the item axis, and creates a reference feature amount vector of the type of Case 1 in FIG. 2 and FIG. 3(a). In this case, the reference data creation unit 22 creates the reference feature amount vector having one or a plurality of predetermined sensor values (for example, five vectors including temperature, pressure, a voltage, and so on) as components.

Secondly, the reference data creation unit 22 creates a new record of the vector component information 33 (FIG. 6).

Thirdly, the reference data creation unit 22 stores an operation state ID, an assigned vector ID, a component definition, and a component value in the operation state ID field 121, the vector ID field 122, the component definition field 126, and the component value field 127 of the new record, respectively. Incidentally, the reference data creation unit 22 searches for the vector information 32 (FIG. 5) using the operation state of the reference sensor value record as a search key to acquire the operation state ID, and stores the acquired operation state ID in the operation state ID field 121 of the new record of the vector component information 33.

Fourthly, the reference data creation unit 22 stores "reference", "frequency axis" or "item axis", and "-" in the classification field 123, the horizontal axis field 124, and the comparison target field 128 of the new record, respectively. The reference data creation unit 22 stores "-" (when the horizontal axis is the item axis) or a sensor value before being subjected to fast Fourier transform of "vibration" or the like (when the horizontal axis is the frequency axis) in the untransformed sensor value field 125 of the new record. The record of the vector component information 33 completed herein is referred to as a "registration-required record".

In Step S205, the reference data creation unit 22 updates the record of the vector information 32. Specifically, firstly, the reference data creation unit 22 searches for the vector information 32 (FIG. 5) using the operation state ID of the registration-required record as a search key, and adds "1" to the number of reference feature amount vectors of the corresponding record to be updated.

Secondly, the reference data creation unit 22 adds the vector ID of the registration-required record to the reference feature amount vector ID field 116 of the corresponding record to be updated.

The reference data creation unit 22 repeats the processing from Steps S203 to S205 at predetermined time intervals (for example, every one minute) until a "repetitive processing end condition" (which will be described immediately later) is satisfied. In the course of the repetitive processing, the reference data creation unit 22 increments the number of reference feature amount vectors of any record of the vector information 32 (FIG. 5) such as 0→1→2→3→ and so on. At a stage where the number of reference feature amount vectors of a certain record of the vector information 32 becomes one or more, the reference data creation unit 22 deletes "not comparable" (initial value) in the evaluation target feature amount vector ID field 118. The reference data creation unit 22 increments the reference feature amount vector ID of any record of the vector information 32 (FIG. 5) one by one.

The reference data creation unit 22 calculates a reference feature amount vector quality (variation) for all the reference feature amount vectors of the corresponding record using the above-described method every time the number of reference feature amount vectors of any record of the vector information 32 (FIG. 5) increases. Further, a predetermined threshold is applied to the calculated variation, and either "large variation" or "small variation" is stored in the reference feature amount vector quality field 117 of the vector information 32. As the repetitive processing proceeds, the reference feature amount vector quality changes such as "large variation"→"small variation"→"large variation"→.and so on. However, the reference feature amount vector quality soon converges to "small variation" in general.

The reference data creation unit 22 stops the operation of the device (the operation may continue) when the repetitive processing end condition is satisfied.

(Repetitive Processing End Condition)

The following example can be given as an example of the repetitive processing end condition.

A fact that the number of reference feature amount vectors of all records of the vector information 32 has become equal to or larger than a predetermined positive number.

A fact that the number of records of the vector information 32 whose reference feature amount vector quality is "small variation" has become a predetermined positive number or more, or has reached a predetermined ratio out of the total number of records.

As is apparent from the above description, the reference data creation unit 22 repeats the process of storing the acquired sensor values in the storage unit in association with each of the plurality of predetermined operation states until there is no non-corresponding operation state with which the acquired sensor value is not yet associated.

In Step S206, the reference data creation unit 22 determines whether the repetitive processing end condition is satisfied. Specifically, the reference data creation unit 22 proceeds to Step S207 if the repetitive processing end condition is satisfied ("Yes" in Step S206), and returns to Step S203 otherwise ("No" in Step S206).

In Step S207, the diagnostic data creation unit 23 of the diagnostic apparatus 1 resumes the operation of the device. At this time, it is assumed that whether the device is normal or abnormal is not known. The devices change operation states variously and continue to operate by user's control or automatic control.

In Step S208, the diagnostic data creation unit 23 acquires sensor values. Specifically, firstly, the diagnostic data creation unit 23 acquires the sensor values from the sensors 8 and 9, and further acquires the respective operation states from other sensors.

Secondly, the diagnostic data creation unit 23 creates a new record of the sensor value information 31 (FIG. 4).

Thirdly, the diagnostic data creation unit 23 stores the operation states and the sensor values acquired in "firstly" of Step S208 in the operation state field 102 and the sensor value field 103 of the newly created record.

Fourthly, the diagnostic data creation unit 23 stores an assigned record ID, a year, a month, a date, an hour, a minute, a second at a current time, "diagnosis target", and "?" in the record field 101, the time field 104, the classification field 105, and the diagnosis result field 106 of the newly created record, respectively. The record of the sensor value information 31 completed herein is referred to as a "diagnosis target sensor value record".

In Step S209, the diagnostic data creation unit 23 creates a diagnosis target feature amount vector. A processing content of Step S209 conforms to a processing content of Step S204. As a result, the diagnostic data creation unit 23 creates records, one by one, below the double line of the vector component information 33 (FIG. 6). Each one of these records is referred to as a "diagnosis-required record". However, the diagnostic data creation unit 23 leaves the comparison target field 128 of the diagnosis-required record as a blank.

In Step S210, the diagnosis unit 24 of the diagnostic apparatus 1 determines a vector as a comparison target. Specifically, firstly, the diagnosis unit 24 searches for the vector information 32 (FIG. 5) using the operation state ID of the diagnosis-required record as a search key, and acquires all reference feature amount vector IDs of the corresponding record. Herein, it is assumed that the diagnosis unit 24 has acquired "SV011, . . . " using, for example, "P001" as the search key.

Secondly, the diagnosis unit 24 refers to the vector component information 33 (FIG. 6) to acquire a component value of the reference feature amount vector identified by the vector ID acquired in "firstly" in Step S210. That is, the diagnosis unit 24 acquires component values of the plurality of reference feature amount vectors "SV011 and so on".

Thirdly, the diagnosis unit 24 creates a vector having an average value of the component values acquired in "secondly" of Step S210 as a component. This vector is referred to as a "representative reference feature amount vector". As a result of the above processing, the diagnosis unit 24 determines the evaluation target feature amount vector identified by the vector ID of the diagnosis-required record and the representative reference feature amount vector as the comparison targets.

Fourthly, the diagnosis unit 24 stores "average of SV011 and so on" in the comparison target field 128 of the diagnosis-required record. Further, the diagnosis unit 24 stores the vector ID "EV01" of the diagnosis-required record in the evaluation target feature amount vector ID field 118 of the record of the vector information 32 (FIG. 5) corresponding to "firstly" in Step S210.

In Step S211, the diagnosis unit 24 performs diagnosis. Specifically, firstly, the diagnosis unit 24 calculates a similarity between the two vectors determined as the comparison targets in "thirdly" in Step S210. Here, the similarity is, for example, a following numerical value.

An inner product of two vectors (the larger the inner product is, the higher the similarity is)
A positive square root of the sum of squares of a difference between components of two vectors (the smaller the positive square root is, the higher the similarity is)
An angle formed by two vectors in a multidimensional space (the smaller the angle is, the higher the similarity is)

Secondly, the diagnosis unit 24 applies a predetermined threshold to the similarity calculated in "firstly" in Step S211 to determine whether the device is normal or abnormal. In this example, a diagnosis result of the reference sensor value record used as a source of creating the registration-required record (corresponding to the vector ID "SV011") is "normal". Then, when the similarity is larger than a threshold, the diagnosis unit 24 determines that "the vector EV01 of the diagnosis-required record is normal". Otherwise, the diagnosis unit 24 determines that "the vector EV01 of the diagnosis-required record is abnormal".

Thirdly, the diagnosis unit 24 displays "normal" or "abnormal" as the diagnosis result on the output device 13 and updates "?", which is the diagnosis result of the diagnosis target sensor value record, to "normal" or "abnormal".

The diagnostic data creation unit 23 and the diagnosis unit 24 repeat the processing from Steps S207 to S211 until the user inputs an "end instruction" via the input device 12. Then, "normal" or "abnormal" is displayed each time the sensor value of the device as the diagnosis target is acquired, and is stored in the diagnosis result field 106 of the sensor value information 31. Incidentally, the description of this repetitive processing is omitted in FIG. 7.

Thereafter, the processing procedure ends.

Incidentally, the diagnosis unit 24 may automatically stop the operation of the device at a time when "abnormal" is displayed for the first time without waiting for the user to input the "end instruction" (device protection). Processing of Step S207 and the subsequent steps can be executed periodically (for example, once a weekend). At this time, it is unnecessary to perform the processing from Steps S201 to S206 again. This is because a necessary reference feature amount vector as a comparison target has already been created.

(Display of Reference Feature Amount Vector Registration Status)

The reference data creation unit 22 constantly monitors the update of the vector information 32 (FIG. 5). The reference data creation unit 22 displays a monitoring result on the output device 13 as a vector registration status screen 51 at an arbitrary stage from Steps S203 to S205 of the processing procedure.

The vector registration status screen 51 will be described with FIG. 8. On the vector registration status screen 51, an operation state ID is displayed in an operation state ID field 52, an operation state is displayed in an operation state field 53, a quality is displayed in a quality field 54, a registration status is displayed in a registration status field 55, and a comprehensive evaluation is displayed in a comprehensive evaluation field 56 in association with each other The reference data creation unit 22 displays the operation state ID of the vector information 32 and the operation states (a burden rate, air temperature, and humidity) in the operation state ID field 52 and the operation state field 53.

The reference data creation unit 22 displays the reference feature amount vector quality of the vector information 32 in the quality field 54. The reference data creation unit 22 refers to the reference feature amount vector number field 115 of each record of the vector information 32 to determine if the reference feature amount vector number is "0", "1 or more and less than a predetermined threshold", or "the predetermined threshold or more".

If the reference feature amount vector number is "0", the reference data creation unit 22 displays "no data" in the registration status field 55 of the corresponding record on the vector registration status screen 51. When the reference feature amount vector number is "1 or more and less than the predetermined threshold", the reference data creation unit 22 displays "uncompleted" in the registration status field 55 of the corresponding record on the vector registration status screen 51. When the reference feature amount vector number is "the predetermined threshold or more", the reference data creation unit 22 displays "completed" in the registration status field 55 of the corresponding record on the vector registration status screen 51.

When the registration status of each record on the vector registration status screen 51 is "no data", the reference data creation unit 22 displays "x" in the comprehensive evaluation field 56 of the record. When the registration status of each record on the vector registration status screen 51 is "completed" and the quality is "small variation", the reference data creation unit 22 displays "○" in the comprehensive evaluation field 56 of the record. Otherwise, the reference data creation unit 22 displays "Δ" in the comprehensive evaluation field 56 of the record.

Further, when the comprehensive evaluations of all the records (operation state IDs) are "○", the reference data creation unit 22 displays "○" in all the operation state fields 57. Otherwise, the reference data creation unit 22 displays "x" in all the operation state fields 57. For example, it is assumed that a user focuses on the comprehensive evaluation field 56 of the vector registration status screen 51 and confirms that "x" is displayed in the field of a certain record. At this time, the user may manually control the device such that an operation state of the device becomes the operation state of the record.

(Modification 1: Stability as Reference Feature Amount Vector Quality)

In the above description, the reference feature amount vector quality is defined as the statistical value indicating the variation in the reference feature amount vector or the character string representing the statistical value. Further, the "variance" is cited as an example of the statistical value. However, the reference feature amount vector quality may be a statistical value indicating a stability of a reference feature amount vector or a character string representing the stability.

When the diagnostic apparatus 1 creates the reference feature amount vector of Case 2 in FIG. 2, the sensor value of the physical quantity serving as the source of fast Fourier transform needs to stably change. For example, the diagnostic apparatus 1 cuts out a sensor value of vibration on the time axis of the device with a "window width" of 30 seconds. It is assumed that there are ten sensor values on the time axis for 30 seconds which have been cut out with such a window frame in the same operation state. For example, the ten sensor values can be classified into a plurality of patterns based on the number of waveforms repeated within the window width, the magnitude of amplitude, and the like. When the sensor values of more than or equal to a predetermined number among the ten sensor values are classified into the same pattern, it is possible to say that the ten sensor values have a high stability. Otherwise, it can be said that the stability is low.

Further, it is assumed that ten spectral intensities on the frequency axis are acquired as a result of fast Fourier transformation of the ten sensor values cut out with the window width. For example, the ten spectral intensities can be classified into a plurality of patterns based on the number of peaks of the spectral intensities, frequencies of the peaks, and the like. When the spectral intensities of more than or equal to a predetermined number among the ten spectral intensities are classified into the same pattern, it is possible to say that the ten spectral intensities have a high stability. Otherwise, it can be said that the stability is low.

(Modification 2: Automatic Creation of Reference Feature Amount Vector)

It is desirable that a positive number other than "0" be stored in the reference feature amount vector number field 115 of all the records of the vector information 32 (FIG. 5). However, there may be cases where an extremely long time elapses with the number of reference feature amount vectors of a certain record remaining as "0" depending on a status when Step S203 is executed. In such a case, the reference data creation unit 22 automatically ends the repetitive processing, and creates the reference feature amount vector by the following creation method.

(Creation Method 1: Linear Interpolation)

For example, it is assumed that the number of reference feature amount vectors of an operation state "P002" in FIG. 5 is "1", the number of reference feature amount vectors of an operation state "P010" is "1", and the number of reference feature amount vectors of an operation state "P006" is "0". Incidentally, numerical examples herein are different from the numerical values of FIG. 5 in order to simplify the description.

That is, when the air temperature is lower than 20° C. and the humidity is 40% or higher, a reference feature amount vector whose load factor is lower than 30% is stored in the vector component information 33 (FIG. 6). A reference feature amount vector whose load factor is 70% or higher is also stored in the vector component information 33. However, a reference feature amount vector whose load factor of 30% or higher and lower than 70% has not been stored in the vector component information 33 (FIG. 6).

The reference data creation unit 22 creates a reference feature amount vector having each average value of each component (each sensor value) of a reference feature amount vector SV021 of the operation state P002 and each component of a reference feature amount vector SV221 of the operation state P010 as each component.

(Creation Method 2: Machine Learning Using Mathematical Model)

More generally, the reference data creation unit 22 uses a linear or nonlinear mathematical model. In this mathematical model, one or a plurality of operation states (for example, a load factor and the like) are input values, and one or a plurality of sensor values (for example, vibration and the like) are output values. Further, this mathematical model has one or a plurality of parameters, and a position and a shape in a coordinate space of the mathematical model also change when a value of the parameter is changed.

The reference data creation unit 22 performs machine learning (for example, regression analysis using a least-square method) using component values of reference feature amount vectors stored in the vector component information 33 (FIG. 6) to determine (optimize) the parameters of the mathematical model. Further, a sensor value is estimated by inputting an unknown operation state (non-corresponding operation state with which the acquired sensor value has not yet been associated) with respect to the mathematical model having the determined parameters.

(Modification 3: Change in Sensor Characteristics)

A sensor is an expendable item and has many opportunities to be replaced with a new one. Even for sensors of the same kind that measure the same kind of physical quantity, sensor characteristics slightly differ depending on individuals. Further, distortion peculiar to an attachment method also occurs depending on the attachment method with respect to a device. Here, it is assumed that a reference feature amount vector SV999 "(temperature, pressure, voltage, current, vibration)=(10, 5, 15, 12, 30)" in a certain operation state P001 is already stored in the vector component information 33 (FIG. 6). Further, it is assumed that a pressure sensor of a device has been replaced thereafter.

Further, it is assumed that an evaluation target feature amount vector EV999 "(temperature, pressure, voltage, current, vibration)=(10, ♭8, 15, 12, 30)" in the same operation state P001 has been created thereafter. A problem is how "♭8" measured by the pressure sensor after replacement is evaluated in comparison with "5" measured by a pressure sensor before replacement.

It can be said that "♭8" measured by the newly replaced pressure sensor is a measurement value which is not misread. However, evaluations thereof can be made as the following two ways.

(Evaluation 1) A measurement value, which needs to be in the vicinity of "5" normally, has become "♭8" in appearance due to a fact that characteristics of the pressure sensor after replacement are different from characteristics of the pressure sensor before replacement. That is, the device is normal since "3" is distortion and a net sensor value is "5" out of "⅝8".

(Evaluation 2) The device is actually abnormal, which appears as an increase in a sensor value of the pressure, regardless of the characteristics of the sensor.

If the sensor characteristics have changed as in Evaluation 1, it is difficult to use a pressure value stored in the sensor value information 31 and a component value of the pressure stored in the vector component information 33 as comparison targets. Then, it is necessary to perform the processing from Steps S203 to S205 of the processing procedure every time the sensor is replaced. This leads to an increase in burden of computer resources. Therefore, the feature amount vectors are newly defined as follows.

$$SV_d = SV - V_r$$

$$EV_d = EV - V_r$$

$$SV_{d\,\%} = (SV - V_r)/V_r \times 100$$

$$EV_{d\,\%} = (EV - V_r)/V_r \times 100$$

Regardless of replacement of sensors, a reference feature amount vector SV has sensor values measured by currently attached sensors directly as each component. Regardless of replacement of sensors, an evaluation target feature amount vector EV has sensor values measured by currently attached sensors directly as each component. A deduction vector $V_r$ has sensor values at a time immediately after a sensor has first attached to the device and at a time immediately after replacing the sensor, directly as each component, in the completely same operation state as the operation state of the reference feature amount vector SV or the evaluation target feature amount vector EV. That is, the deduction vector $V_r$ has values (reference values) measured for the first time by the "new" sensors as the respective components. Therefore, any one of the components of the deduction vector $V_r$ changes every time any one of the sensors is replaced.

Since the vectors are re-defined in this manner, each component of a reference feature amount vector $SV_d$ indicates a difference from a desired level. Each component of a reference feature amount vector $SV_{d\,\%}$ indicates a ratio of the difference from the desired level relative to the level. The same description applies to evaluation target feature amount vectors $EV_d$ and $EV_{d\,\%}$. When each component of the reference feature amount vector and the evaluation target feature amount vector are set to such a relative value, it becomes unnecessary to recreate the reference feature amount vector every time the sensor is replaced. However, it is necessary to store the deduction vector $V_r$ immediately after attaching the new sensor every time the sensor is replaced.

(Modification 4: Case where it is Difficult to Acquire Reference Feature Amount Vectors Corresponding to all Operation States)

There may be a case where it is difficult to create reference feature amount vectors corresponding to all of the combinations of operation states determined in Step S201. For example, the humidity was divided into the two ranges of "lower than 40(%)" and "40(%) or higher" in the above example. This division is made based on an assumption that the humidity naturally fluctuates before and after the humidity of 40% as the boundary such as the climate in Japan, for example.

Here, for example, it is assumed that a device has been moved to a dry zone without changing the divisions "lower than 40(%)" and "40(%) or higher". It is almost impossible for the reference data creation unit 22 to create a reference feature amount vector in an operation state of the humidity of 40% or higher. This is because the humidity is always at a level close to 0% in a place such as a desert. Then, the division of the humidity as the operation state into "lower than 40(%)" and "40(%) or higher" in the first place becomes meaningless. Such a status in which reference feature amount vectors are concentrated in a specific range regarding a specific operation state even if the processing from Steps S203 to S205 is repeated a predetermined number of times is referred to as a "reference data uneven-distribution status".

Therefore, when the reference data uneven-distribution status occurs, the reference data creation unit 22 displays a first message on the output device 13 to call the user's attention. For example, the first message is "it is difficult to create reference feature amount vectors so as to correspond to all the operation states. Would you like to continue acquiring a sensor value without any change (S203)?".

When receiving "Yes" input via the input device 12 by the user as a response to the first message, the reference data creation unit 22 repeats the processing from Steps S203 to S205. Further, when the reference data uneven-distribution status is resolved, the reference data creation unit 22 displays a second message on the output device 13. For example, the second message is "the reference feature amount vectors have been created so as to correspond to all the operation states".

If receiving "Yes" as the response to the first message, the reference data creation unit 22 may ignore "humidity" among the operation states and regard that the operation states include combinations of the remaining the "load factor" and the "temperature" (3×2=6).

On the other hand, if receiving "No" as the response to the first message, the reference data creation unit 22 ends the repetitive processing while maintaining the reference data uneven-distribution status. Thereafter, the diagnostic data creation unit 23 creates a diagnosis target feature amount vector in Step S209. At this time, when a diagnosis target feature amount vector (referred to as "non-diagnosable vector") has been created in an operation state for which a reference feature amount vector has not yet been created, the diagnostic data creation unit 23 displays a third message on the output device 13. For example, the third message is "The diagnosis target feature amount vector for which no comparison target exists has been created. Would you like to continue diagnosis without any change?".

If receiving "No" as a response to the third message, the diagnostic data creation unit 23 ends the processing procedure. If receiving "Yes" as the response to the third message, the diagnostic data creation unit 23 executes the processing of Steps S210 and S211. However, the diagnosis unit 24 displays "non-diagnosable" as a diagnosis result for the non-diagnosable vector in "thirdly" of Step S211, and displays "normal" or "abnormal" as a diagnosis result for the other diagnosis target feature amount vectors.

Effects of Present Embodiment

Effects of the diagnostic apparatus of the present embodiment are as follows.

(1) The diagnostic apparatus can prepare the comparison target at the time of diagnosing the device with respect to the assumed operation state without omission.

(2) The diagnostic apparatus can perform diagnosis objectively by comparing the vectors with each other, and further, easily use existing various kinds of software.

(3) The diagnostic apparatus can allow the user to easily view that the comparison targets at the time of diagnosing the device have been prepared without omission.

(4) The diagnostic apparatus can allow the user to easily view the quality of the prepared comparison target.

(5) The diagnostic apparatus determines the quality of the prepared comparison target based on the variation or the stability of the sensor value. Therefore, the quality of the comparison target can be objectively evaluated.

(6) The diagnostic apparatus can prevent the process of creating the data as the diagnosis target from being in vain.

(7) The diagnostic apparatus can use the sensor values suitable for improving the diagnostic accuracy by comparing the spectral intensities on the frequency axis of the sensor values.

(8) The diagnostic apparatus prepares comparison targets for each combination of one or a plurality of operation states including the environment of the device. Therefore, it is possible to perform detailed diagnosis in accordance with a change in the operation state.

(9) The diagnostic apparatus compares vectors having relative values as the respective components. Therefore, it is unnecessary to create the comparison target once prepared again even if a sensor is replaced.

(10) Even if it is difficult to measure a sensor value corresponding to a specific operation state, the diagnostic apparatus can estimate the sensor value based on other measured sensor values.

(11) The diagnostic apparatus estimates the sensor value by machine learning using the mathematical model. Therefore, the diagnostic accuracy can be maintained high even if it is difficult to measure the sensor value corresponding to the specific operation state.

Incidentally, the present invention is not limited to the above-described embodiment and includes various modifications. For example, the above-described embodiment has been described in detail in order to describe the present invention in an easily understandable manner, and is not necessarily limited to one including the entire configuration that has been described above. In addition, some configurations of a certain embodiment can be substituted by configurations of another embodiment, and further, a configuration of another embodiment can be also added to a configuration of a certain embodiment. In addition, addition, deletion, or substitution of other configurations can be made with respect to some configurations of each embodiment.

In addition, a part or all of each of the above-described configurations, functions, processing units, processing means, and the like may be realized, for example, by hardware by designing with an integrated circuit and the like. In addition, each of the above-described configurations, functions, and the like may also be realized by software by causing a processor to interpret and execute a program for realizing each of the functions. Information such as programs, tables, and files that realize the respective functions can be installed in a storage device such as a memory, a hard disk, and a solid state drive (SSD), or a storage medium such as an IC card, an SD card, and a DVD.

In addition, only control lines and information lines considered to be necessary for the description have been illustrated, and all of the control lines and information lines required as a product are not necessarily illustrated. It may be considered that most of the configurations are practically connected to each other.

REFERENCE SIGNS LIST 1 diagnostic apparatus
2 electric motor
3 load
8, 9 sensor
11 central control device
12 input device
13 output device
14 main storage device
15 auxiliary storage device
16 communication device
21 operation state determination unit
22 reference data creation unit
23 diagnostic data creation unit
24 diagnosis unit
31 sensor value information
32 vector information
33 vector component information

The invention claimed is:

1. A diagnostic apparatus comprising:
a memory coupled to a processor, the memory storing instructions that when executed by the processor configure the processor to:
acquire sensor values from sensors on the device,
determine, a plurality of reference times of operation states at which the device is known to be normal or abnormal;
a reference data creation that repeats a process of storing the sensor values acquired from the device while changing the operation states at the different references times in association with each of the determined operation states until there is no non-corresponding operation state with which the acquired sensor value is not yet associated;
a diagnostic data creation unit that acquires, at a diagnosis time at which it is not known whether the device is normal or abnormal, an operation state and a sensor value of the device at the time; and
a diagnosis unit that reads the sensor value associated with the acquired operation state from the storage unit and compares the sensor value acquired at the diagnosis time with the read sensor value to display a result of determination on whether the device is normal or abnormal.

2. The diagnostic apparatus according to claim 1, wherein the sensor value is a value obtained by representing a feature amount of a measurement value measured by a sensor in a vector form, and
the diagnosis unit compares a diagnosis target feature amount vector representing the sensor value acquired at the diagnosis time with a reference feature amount vector representing the read sensor value.

3. The diagnostic apparatus according to claim 2, wherein the reference data creation unit displays that the non-corresponding operation state has disappeared.

4. The diagnostic apparatus according to claim 3, wherein the reference data creation unit displays a quality of the sensor value acquired at the reference time.

5. The diagnostic apparatus according to claim 4, wherein the reference data creation unit determines the quality based on statistics indicating variations or stability of a plurality of sensor values acquired under an identical operation state.

6. The diagnostic apparatus according to claim 5, wherein the diagnostic data creation unit starts a process of acquiring the operation state of the device and the sensor value triggered by disappearance of the non-corresponding operation state.

7. The diagnostic apparatus according to claim 6, wherein the sensor value includes a value obtained by converting a measurement value on a time axis measured by the sensor into a spectral intensity on a frequency axis.

8. The diagnostic apparatus according to claim 7, wherein the operation state is a combination of a plurality of indices relating to an operation of the device, and the indices include an index for a burden of the device or an environment in which the device is placed.

9. The diagnostic apparatus according to claim 8, wherein the reference feature amount vector and the diagnosis target feature amount vector have a relative value based on a difference from a predetermined reference value as a component.

10. The diagnostic apparatus according to claim 9, wherein
the reference data creation unit estimates a sensor value that needs to be associated with the non-corresponding operation state based on a sensor value that has been already acquired when the non-corresponding operation state does not disappear within a predetermined period.

11. The diagnostic apparatus according to claim 10, wherein
the reference data creation unit estimates the sensor value that needs to be associated with the non-corresponding operation state by machine learning of a parameter of a mathematical model having the operation state as an input variable and the sensor value as an output variable.

12. A diagnostic method of a diagnostic apparatus, the method comprising:
acquiring sensor values from sensors on the device;
determining, a plurality of reference times of operation states at which the device is known to be normal or abnormal;
repeating a process of storing the sensor values acquired from the device while changing the operation states at the different reference times in a storage unit in association with each of the determined operation states until there is no non-corresponding operation state with which the acquired sensor value is not yet associated, by a reference data creation unit of the diagnostic apparatus;
acquiring, at a diagnosis time at which it is not known whether the device is normal or abnormal, an operation state and a sensor value of the device at the time, by a diagnostic data creation unit of the diagnostic apparatus; and
reading the sensor value associated with the acquired operation state from the storage unit and comparing the sensor value acquired at the diagnosis time with the read sensor value to display a result of determination on whether the device is normal or abnormal, by a diagnosis unit of the diagnostic apparatus.

13. A non-transitory computer readable medium storing a diagnostic program configured to cause a diagnostic apparatus to function, the program comprising steps of:
acquiring sensor values from sensors on the device;
determining a plurality of references times of operation states at which the device is known to be normal or abnormal;
repeating a process of storing the sensor values acquired from the device while changing the operation states at the different reference times in a storage unit in association with each of the determined operation states until there is no non-corresponding operation state with which the acquired sensor value is not yet associated;
a diagnostic data creation unit of the diagnostic apparatus to execute a process of acquiring, at a diagnosis time at which it is not known whether the device is normal or abnormal, an operation state and a sensor value of the device at the time; and
a diagnosis unit of the diagnostic apparatus to execute a process of reading the sensor value associated with the acquired operation state from the storage unit and comparing the sensor value acquired at the diagnosis time with the read sensor value to display a result of determination on whether the device is normal or abnormal.

* * * * *